United States Patent [19]
Major

[11] Patent Number: 6,018,927
[45] Date of Patent: Feb. 1, 2000

[54] THERMOFORMED TWIN-SHEET PANEL

[75] Inventor: Daniel E. Major, Knoxville, Tenn.

[73] Assignee: Formall, Inc., Knoxville, Tenn.

[21] Appl. No.: 09/062,144

[22] Filed: Apr. 17, 1998

[51] Int. Cl.$^7$ .................. B32B 3/12; B32B 3/30; B65D 19/18; E04C 2/20

[52] U.S. Cl. .................. 52/793.1; 52/309.1; 52/789.1; 108/57.25; 108/57.27; 108/901; 248/346.02; 428/178

[58] Field of Search .................. 52/789.1, 793.1, 52/783.1, 309.1, 302.3; 108/57.25, 57.26, 57.27, 57.28, 57.29, 901, 902; 248/346.02, 678; 428/178, 179, 180

[56] References Cited

U.S. PATENT DOCUMENTS

| | | |
|---|---|---|
| 3,524,415 | 8/1970 | Heiman . |
| 3,563,184 | 2/1971 | Angelbeck, Jr. . |
| 3,604,368 | 9/1971 | Baxter .................. 108/901 X |
| 3,636,888 | 1/1972 | Angelbeck, Jr. . |
| 3,640,229 | 2/1972 | Bell .................. 108/57.28 |
| 3,667,403 | 6/1972 | Angelbeck, Jr. . |
| 3,719,157 | 3/1973 | Arcocha et al. . |
| 3,750,596 | 8/1973 | Box . |
| 4,428,306 | 1/1984 | Dresen et al. .................. 108/901 X |
| 4,516,677 | 5/1985 | Rowland et al. . |
| 4,606,278 | 8/1986 | Shuert . |
| 4,879,956 | 11/1989 | Shuert .................. 108/901 X |
| 5,401,347 | 3/1995 | Shuert .................. 108/901 X |
| 5,408,937 | 4/1995 | Knight, IV et al. .................. 108/901 X |
| 5,470,641 | 11/1995 | Shuert .................. 108/57.27 X |
| 5,758,855 | 6/1998 | Jordan et al. .................. 248/678 X |
| 5,894,045 | 4/1999 | Desrondiers .................. 52/793.1 X |

*Primary Examiner*—Laura A. Callo
*Attorney, Agent, or Firm*—Luedeka, Neely & Graham, P.C.

[57] ABSTRACT

A structural, load bearing panel is fabricated with twin-sheets of thermoformed polymer material to provide substantially equal bending strength about each of substantially normal polar moment axes. Parallel rows of generally rectangular depressions in the top sheet surface are fused with a corresponding row pattern of depressions in the bottom sheet surface oriented substantially 90° to the top sheet rows. End walls of top sheet depressions are fused with side walls of bottom sheet depressions. Conversely, end walls of bottom sheet depressions are fused with side walls of top sheet depressions. An orthogonal matrix of interconnected gas flow channels vent substantially all void spaces between the top and bottom sheets.

13 Claims, 5 Drawing Sheets

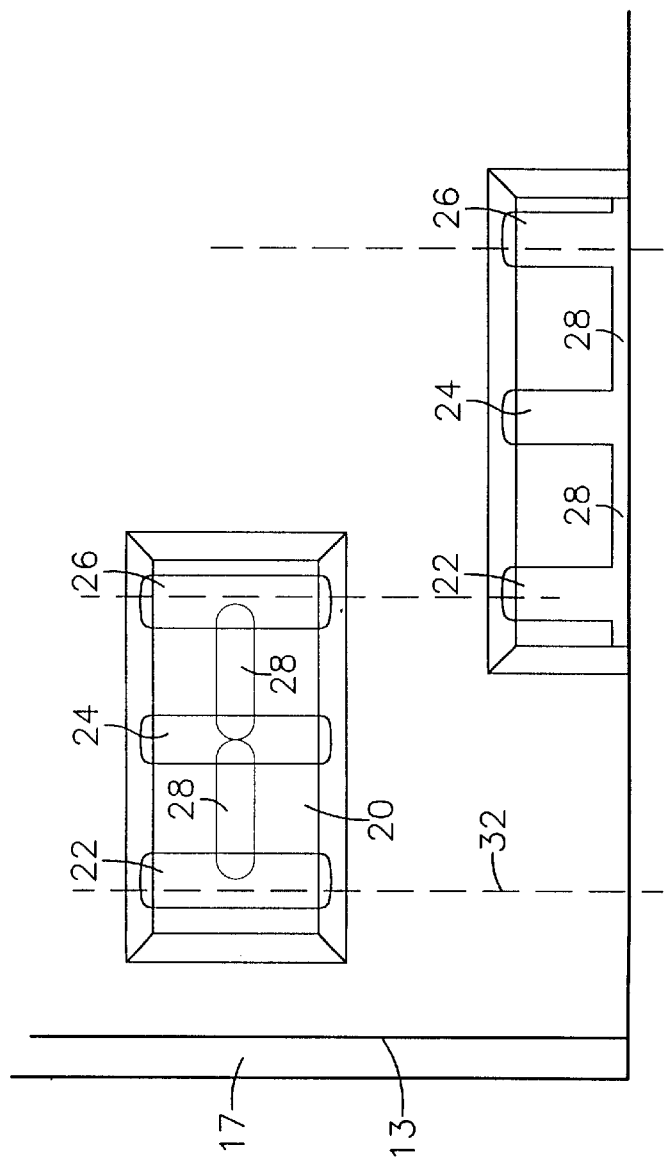
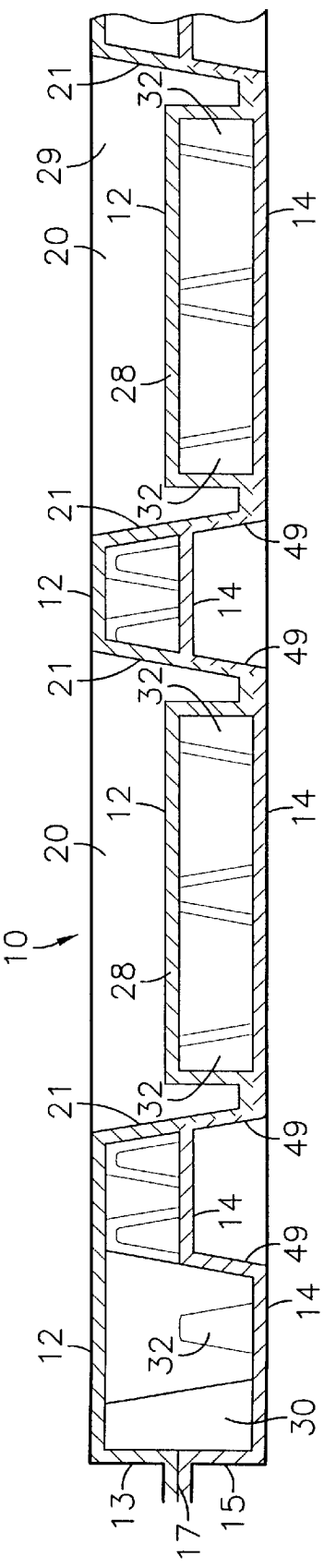

THERMOFORMED TWIN-SHEET PANEL

BACKGROUND OF THE INVENTION

This invention relates to structural panels that are fabricated from sheets of thermoformable polymer materials.

Thermoformed twin-sheet pallets are generally known to the prior art as providing a leg supported load platform for storing and transporting goods and material. The leg support distinctive to pallet construction is considered as essential to the convenient placement of pallet lifting or moving elements. Frequently, these lifting elements are the blades or tines of a fork truck.

The need to provide protected space under a pallet for lifting blade penetration presents distinctive design constraints for twin-sheet pallet fabricators. Panels of substantially uniform thickness between specially separated top and bottom sheets present other design and fabrication constraints. One highly desirable characteristic of a loading panel, which has no leg or floor rail elements, is substantially uniform bending strength about mutually normal polar movement axes within the panel plane.

Another desirable characteristic, common to any thermoformed twin-sheet article, is a rapid fabrication cooling rate. Generally, twin-sheet articles are formed in a vacuum mold having respective forming dies in each of two half shells. A first sheet of hot, plastic flow thermoformable polymer is gas sealed against one forming die and a vacuum drawn between the die form and the sheet. The uniformly distributed atmospheric pressure load on the "outer" face of the hot polymer sheet presses it into intimate contact with the die form surface.

With the first sheet formed, the vacuum is sustained against the first formed sheet while the mold is opened and a second unformed sheet of hot polymer is positioned with a gas seal against the other forming die. The mold is again closed to press the first sheet form into the second sheet as a vacuum is drawn between the second sheet and the other die form surfaces.

At the very heart of the twin-sheet structural strength is the moment separation space between the planes of the two sheets. However, consistent with traditional I-beam practice, the two panels must also be unitized by tying structure. It is the presence of such tying structure that creates closed cells in the void space between the two constituent sheets.

After the twin-sheet article is formed, it must remain in the mold until it cools sufficiently for self-support and form stability in the absence of mold confinement. Such retention of the article in the mold terminates mold production during the cooling interval. In some cases, the void space between the formed sheets is penetrated by a pressurized air discharge conduit to cool the article with an internal flush flow of cooling gas, usually air. However, if the internal volume of the article includes a significant percentage of closed cell volume, the flush flow of cooling air has a substantially reduced effect.

It is, therefore, an object of the present invention to provide a thermoformed twin-sheet structural panel having uniformly oriented bending strength.

Another object of the invention is a twin-sheet structural panel having a high rate of post-formation cooling.

Also an object of the invention is a twin-sheet panel adapted to a high rate of productivity.

A further object of the invention is a twin-sheet panel having substantially no closed cells within the internal volume.

An additional object of the invention is a twin-sheet panel having a substantially open and internally vented void volume.

SUMMARY OF THE INVENTION

These and other objects of the invention as will become apparent from the drawings and following description of the invention, are achieved by a structural panel having specially separated and substantially parallel surface planes formed by top and bottom sheets of thermoformable material. Each of the top and bottom sheets are thermally formed with a pattern of substantially rectangular depressions having an approximately 3 to 1 length to width ratio. The depth of these depressions spans the separation distance between the top and bottom sheets whereby the bottom of a top sheet depression is fused to the bottom sheet, and vice versa.

The depressions respective to both top and bottom sheets are longitudinally aligned in substantially parallel rows with adjacent depression ends being separated by about the distance of a depression width. The depressions are separated laterally between adjacent rows by about one depression width, also.

Orientation of the top sheet depression rows is substantially 90° to the bottom sheet depression rows whereby the end walls of top sheet depressions are thermally fused with the side walls of bottom sheet depressions. Conversely, the end walls of bottom sheet depressions are thermally fused with the side walls of top sheet depressions.

Internal gas flow channels traverse the width of each depression to vent isolated pocket spaces formed between the depressions. These flow channels are aligned in an orthogonal matrix pattern to vent the pocket spaces into a continuously open perimeter space around the depression pattern.

Upon completion of the thermal forming process for forming a twin-sheet panel and preferably while the panel remains in the forming die, one or both of the sheets are penetrated in the area that defines the open perimeter space by cooling air supply conduits. From these cooling air supply conduits a flushing flow of cool air is forced through the labyrinth of flow channels and pockets formed by the depression pattern to accelerate the finished panel cooling process.

BRIEF DESCRIPTION OF THE DRAWINGS

The foregoing features and characteristics of the invention preferred embodiment will be more readily understood from the following description when considered in conjunction with the accompanying drawings wherein:

FIG. 4 is a sectioned end view of the invention along cutting planes 4—4 of FIGS. 1–3;

FIG. 5 is an enlarged detail of the invention top plan;

DESCRIPTION OF THE PREFERRED EMBODIMENT

Figure 1:
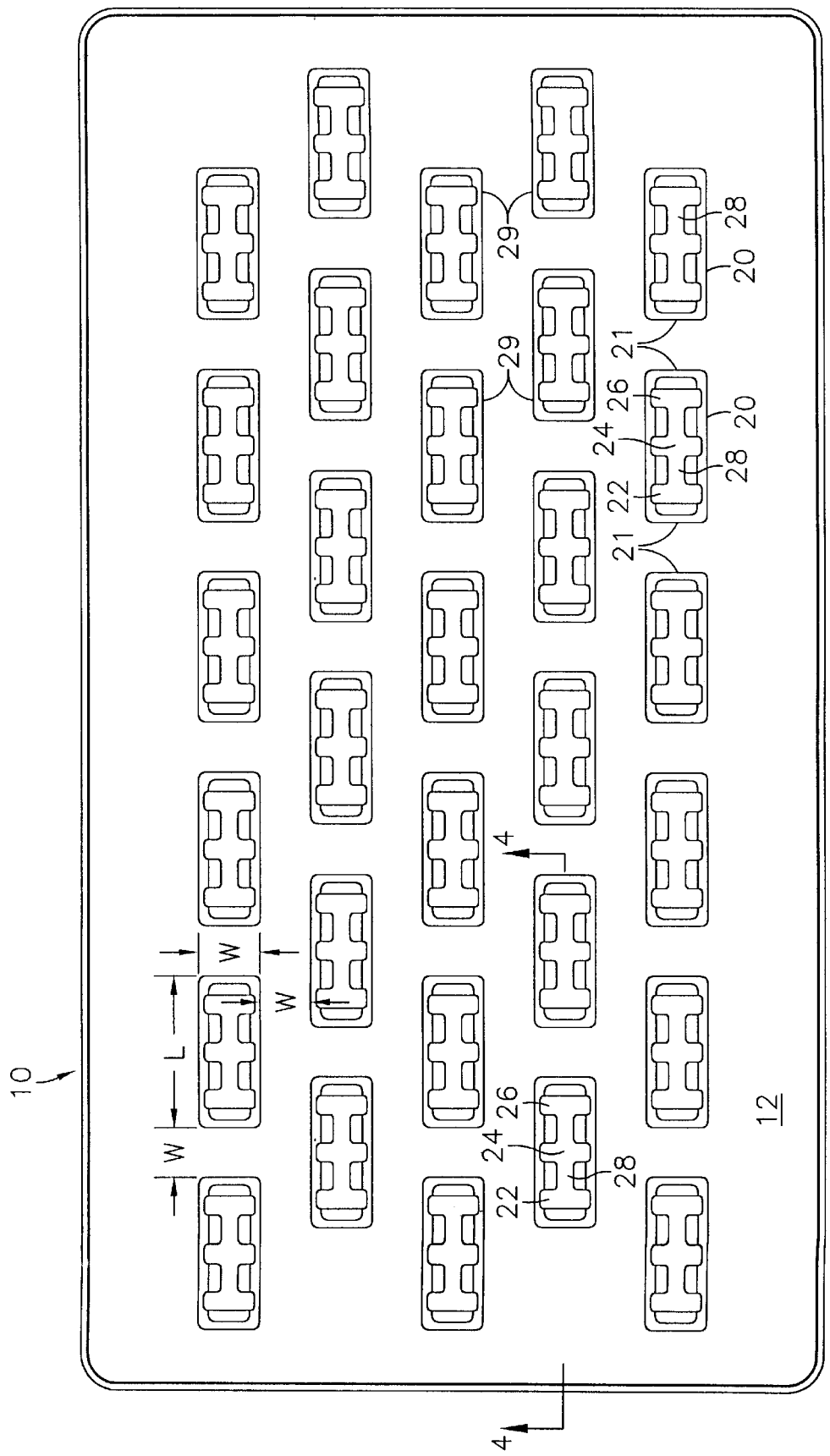
FIG. 1 is a top plan view of the invention.

Referring to the drawings wherein like reference characters designate like or similar elements throughout the several figures of the drawing, FIGS. 1 through 5 illustrate a twin-sheet panel 10 fabricated from a pair of thermoformable polymer sheets. These sheets are formed as structural surface shells that enclose a substantial void space therebetween. Generally, the sheet thickness is substantially less than the void space separation between the sheets. Representatively, polymer sheets of about ⅛ in. thickness are formed as substantially parallel outer shells that are specially separated by about 1⅜ in. to enclose a void space therebetween.

In a production process sequence generally known to the prior art, a bottom sheet 14 is heated and positioned hot against a vacuum forming mold. In some cases, the blank bottom sheet may be placed in the mold cold and heated therein. In either case, the hot polymer sheet is deformed over the bottom mold surfaces by atmospheric pressure when the void space between the bottom mold surfaces and the hot sheet 14 is abruptly evacuated.

With the bottom sheet 14 formed, a second sheet 12 of hot polymer from which the top sheet is to be formed is positioned against a top mold. With the two sheets drawn tightly against respective top and bottom mold surfaces, the two mold units are brought together. Predetermined elements of the bottom sheet 14 engage the top sheet 12 at distributed contact positions and selected elements of the top sheet 12 engage the bottom sheet surfaces. Complete closure of the two molding units fuses the top and bottom sheets together at the distributed contact positions.

The general procedure described above is specifically applied to the present invention to form a pattern of depressions 20 in the surface of the top sheet 12 and a cooperative pattern of depressions 40 in the surface of the bottom sheet 14. These depressions are generally rectangular, having a length dimension L that is about 3 times the width dimension W. The depression distribution pattern aligns the depressions in substantially parallel rows with the depression length dimension L in parallel alignment with the respective row length.

Within a row, the several depressions are separated between adjacent ends by a distance approximately corresponding to the depression width W. Similarly, the rows are separated by a space W between adjacent depression sides respective to adjacent rows. Additionally, adjacent rows are longitudinally offset whereby an end separation space between adjacent depressions in the same row is flanked by the sides of depressions in the adjacent row or rows.

Figure 2:
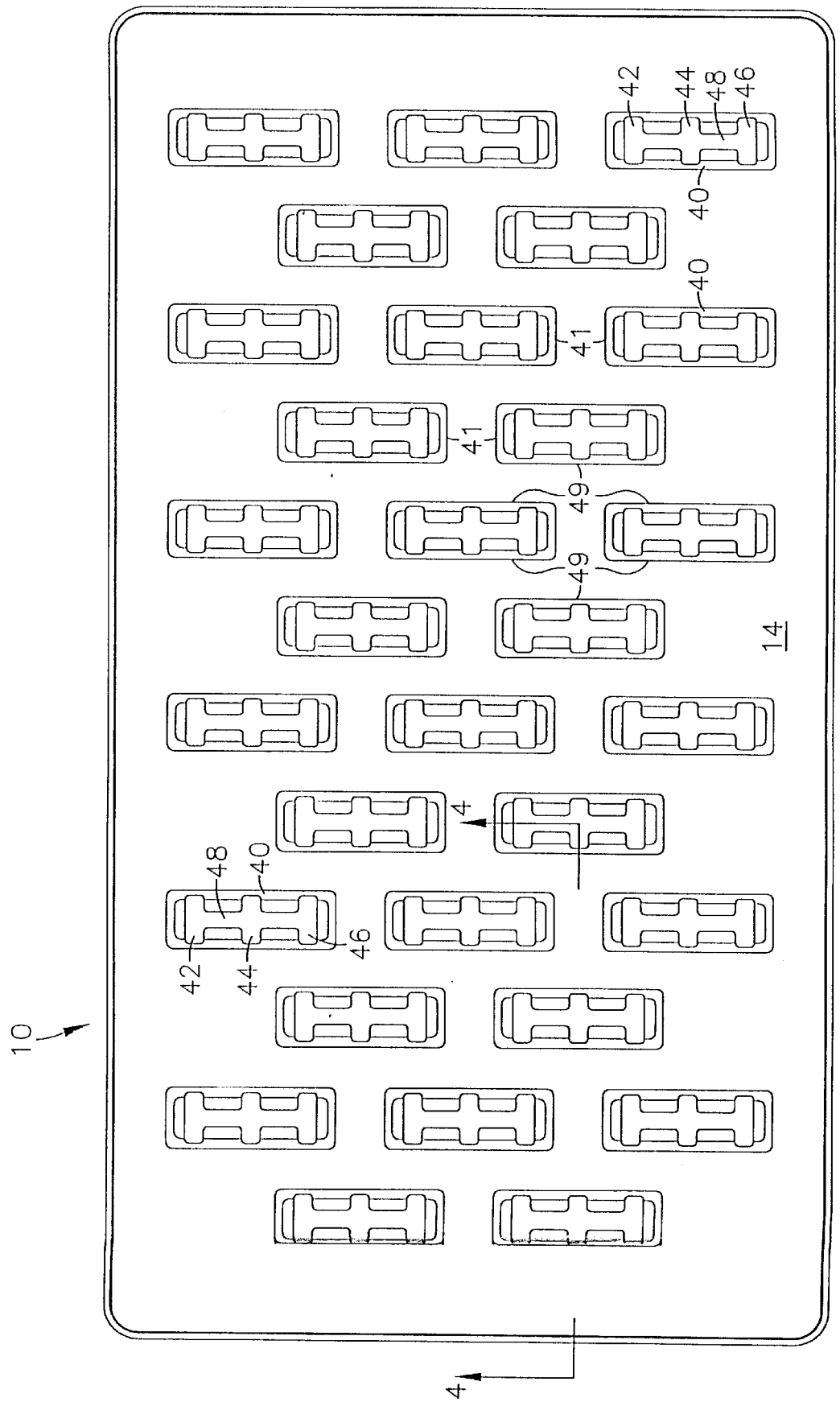
FIG. 2 is a bottom plan view of the invention.

Viewing FIGS. 1 and 2 comparatively, it will be noted that the rows of depressions 40 in the panel bottom 14 are oriented about 90° to the rows of depressions 20 in the panel top 12. The end walls 21 of the top depressions 20 are thermally fused with the side walls 49 of the bottom depressions 40. Similarly, the end walls 41 of the bottom depressions 40 are fused with the side walls 29 of the top depressions 20.

Figure 3:
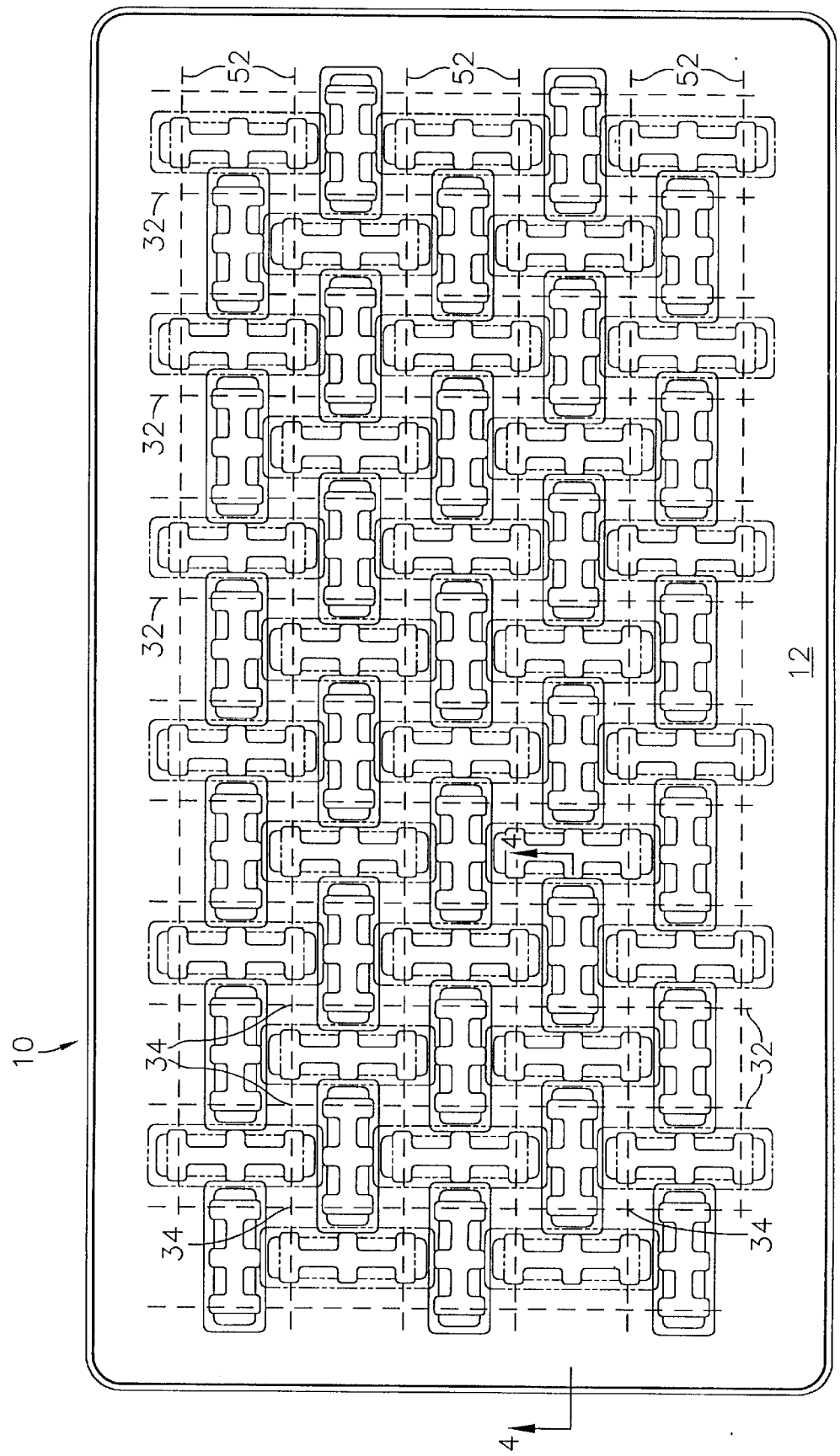
FIG. 3 is a top plan view of the invention with a phantom line superposition of bottom plan features.

Next to be noted about the depressions 20 is a pattern of three cross ridges 22, 24 and 26 between the sidewalls of each depression 20. A fourth longitudinal ridge 28 traverses the three cross ridges. Similarly, the bottom depressions 40 include three cross ridges 42, 44 and 46 linked by a longitudinal ridge 48. Each of these ridges constitutes a structural conduit shell over an internal gas flow passageway. Accordingly, all of the cross ridges 22 and 26, alternately, are substantially aligned along axes 32 as shown by FIG. 3 so as to provide continuous gas flow channels from one side of the panel 10 to the other within the volume enclosed between the top and bottom sheets 12 and 14. Also, all of the cross ridges 42 and 46, alternately, are substantially aligned along axes 52 so as to provide continuous gas flow channels from one end of the panel 10 to the other.

Figure 7:
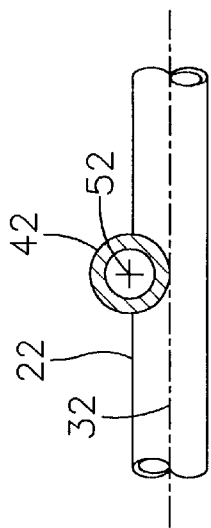
FIG. 7 is a sectioned detail along cutting plane 7—7 of FIG. 6.
Figure 8:
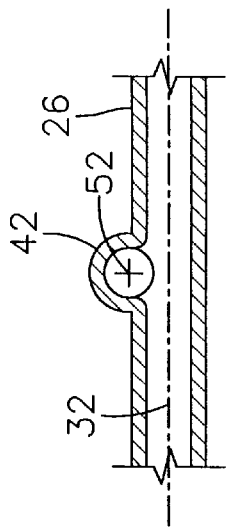
FIG. 8 is a sectioned detail along cutting plane 8—8 of FIG. 6.
Figure 6:
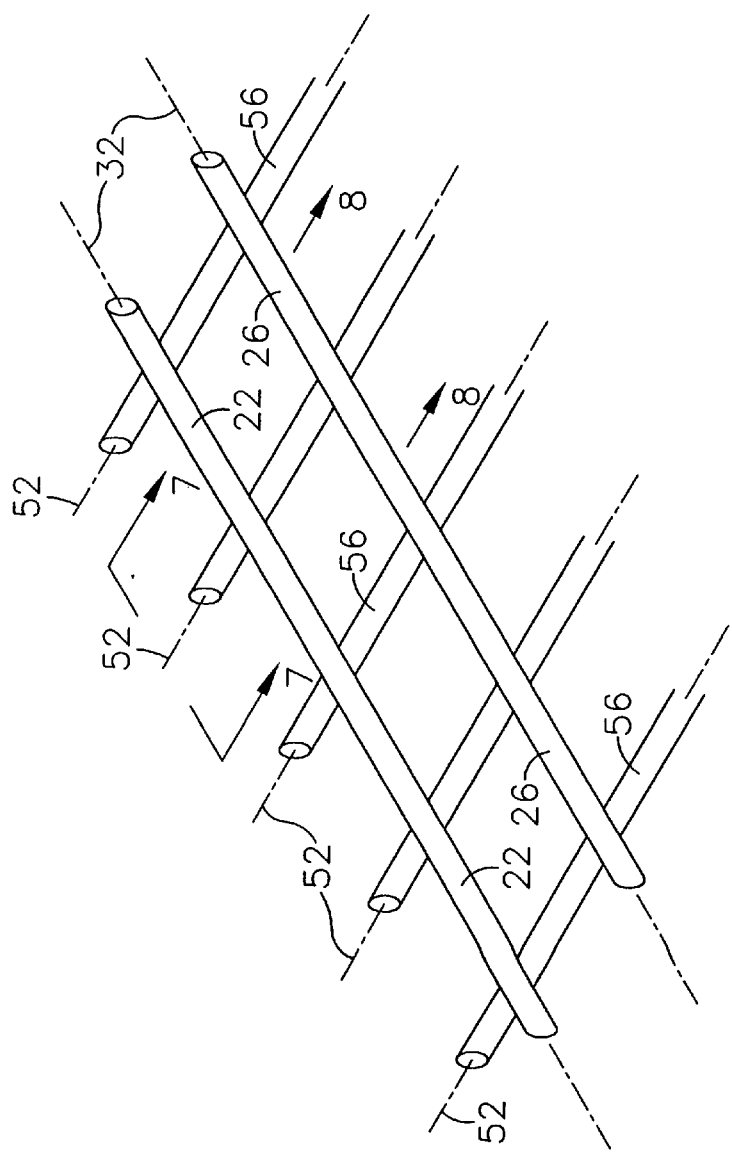
FIG. 6 is a schematic representation of the gas venting system for the invention.

FIGS. 6 through 8 illustrate a schematic representation of the orthogonal, gas flow channel matrix formed by the cross-ridge conduits 22, 26 and 42, 46 along the axes 32 and 52, respectively. Of specific note is an offset of the plane common to the axes 32 from the plane common to axes 52. Resultantly, the channel continuity of conduits 22 and 26 intersects the channel continuity of conduits 42 and 46 at mutually open areas of gas flow communication.

Viewing FIG. 4 an internal perimeter space 30 between the top and bottom sheets 12 and 14 is enclosed by the side walls 13 and 15. The sidewalls are adjoined by a fused flange 17. This perimeter space is open throughout. The fused juncture of top depression end walls with bottom depression side walls creates a pattern of closed cells 34 distributed across the panel 10 area each filled with gaseous atmosphere at an elevated temperature and pressure. The matrix of channels 22, 26, 42 and 46 penetrates these closed cells 34 as gas flow openings into the perimeter space 30.

Upon completion of a panel 10 formation, the hot, thermoplastic material substance of the panel should remain in the forming die until it cools sufficiently to regain structural self-sufficiency. Although essential to product quality and accuracy, this cooling interval immobilizes the capital value of the thermoforming equipment thereby adding to the cost of the product. To reduce the cooling interval, provision is made in the die to penetrate the perimeter space 30 at numerous points not specifically shown. Each of these penetration points comprise an opening of about ¼ in. to about ½ in. About half of these openings are connected to a cool air supply source. The other half of the openings are either vented to atmosphere or evacuated. In either case, the hot, pressurized air trapped between the panel sheets 10 and 14 is removed and the internal surfaces of the panel 10 enclosure are flushed with a strong flow of heat extracting cool air. Due to the matrix of gas flow channels, the cells 34 are also vented and cooled.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application and to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

As my invention, therefore,

I claim:

1. A thermoformed twin-sheet panel having top and bottom shell members, said shell members being secured together in substantially parallel top and bottom plane alignment with an enclosed void space therebetween, a plurality of elongated depressions in said top and bottom shell members having length between end walls greater than width between side walls and depth across said void space between said shell members, said depressions in said top shell member being longitudinally aligned in substantially parallel rows with the length of said depressions in one said row being offset from the length of said depressions in laterally adjacent said rows, the orientation of said rows in said top shell member being substantially normal to the orientation of corresponding rows in said bottom shell member, said end walls of said depressions in said top shell member being fused with said side walls of said depressions in said bottom shell member and said end walls of said depressions in said bottom shell member being fused with said side walls of said depressions in said top shell member.

2. A twin-sheet panel as described by claim 1 wherein bottoms respective to the depressions in said top shell member are fused with said bottom shell member and bottoms respective to the depressions in said bottom shell member are fused with said top shell member.

3. A twin-sheet panel as described by claim 1 wherein the length of said depressions is proportional to the width of said depressions by a ratio of about 3:1.

4. A twin-sheet panel as described by claim 1 having a substantially orthogonal matrix of interconnected gas flow channels within said void space.

5. A twin-sheet panel as described by claim 4 wherein said gas flow channels comprise conduit enclosures traversing the width of said depressions between opposite said side walls.

6. A twin-sheet panel as described by claim 5 wherein said conduit enclosures between opposite said side walls of said depressions are interconnected by a transverse conduit enclosure.

7. A twin-sheet panel as described by claim 5 wherein at least a portion of said conduit enclosures across said depressions in a first said row, are substantially aligned with said conduit enclosures across the depressions of adjacent said rows.

8. A structural panel having substantially parallel, spacially separated top and bottom surface planes, said surface planes being formed by top and bottom sheets of thermally formable material having respective sheet thickness substantially less than the spacial separation between said top and bottom surface planes, said panel further comprising a plurality of substantially rectangular depressions into said top and bottom surface planes, said depressions having a depth dimension between said top and bottom surface planes and bounded by side walls along a length dimension and end walls along a width dimension, said depressions in each surface plane being aligned in a plurality of substantially parallel rows with said depression length dimension aligned substantially parallel with a respective said row, each depression being spaced from adjacent said depressions in the same said row by approximately the same distance as said depression width dimension, each depression being spaced from adjacent said depressions in adjacent said rows by approximately the same dimension as said depression width dimension, space between adjacent said depressions in one said row being substantially symmetrically offset from the corresponding space between said depressions of laterally adjacent said rows, the rows of said depressions in said top surface plane being oriented substantially normal to the rows of said depressions in said bottom surface plane whereby the end walls of said depressions in said top surface plane are fused with said side walls of said depressions in said bottom surface plane.

9. A structural panel as described by claim 8 wherein the width dimension of said depressions is about one-third of the length dimension.

10. A structural panel as described by claim 8 having a substantially orthogonal matrix of interconnected gas flow channels internally of said panel.

11. A structural panel as described by claim 10 wherein said gas flow channels include conduit enclosures between opposite said side walls of said depressions.

12. A structural panel as described by claim 11 wherein said conduit enclosures between opposite said side walls of said depressions are interconnected by a transverse conduit enclosure.

13. A structural panel as described by claim 11 wherein at least a portion of said conduit enclosures across the depressions in a first said row are substantially aligned with said conduit enclosures across the depressions of adjacent said rows.

* * * * *